Jan. 1, 1963  C. A. LANE ET AL  3,071,031
THERMIONIC VALVE GRID WINDING MACHINES
Filed March 3, 1959  3 Sheets-Sheet 1

INVENTORS
CLAYTON ARBUTHNOT LANE
JOHN KAY
BY

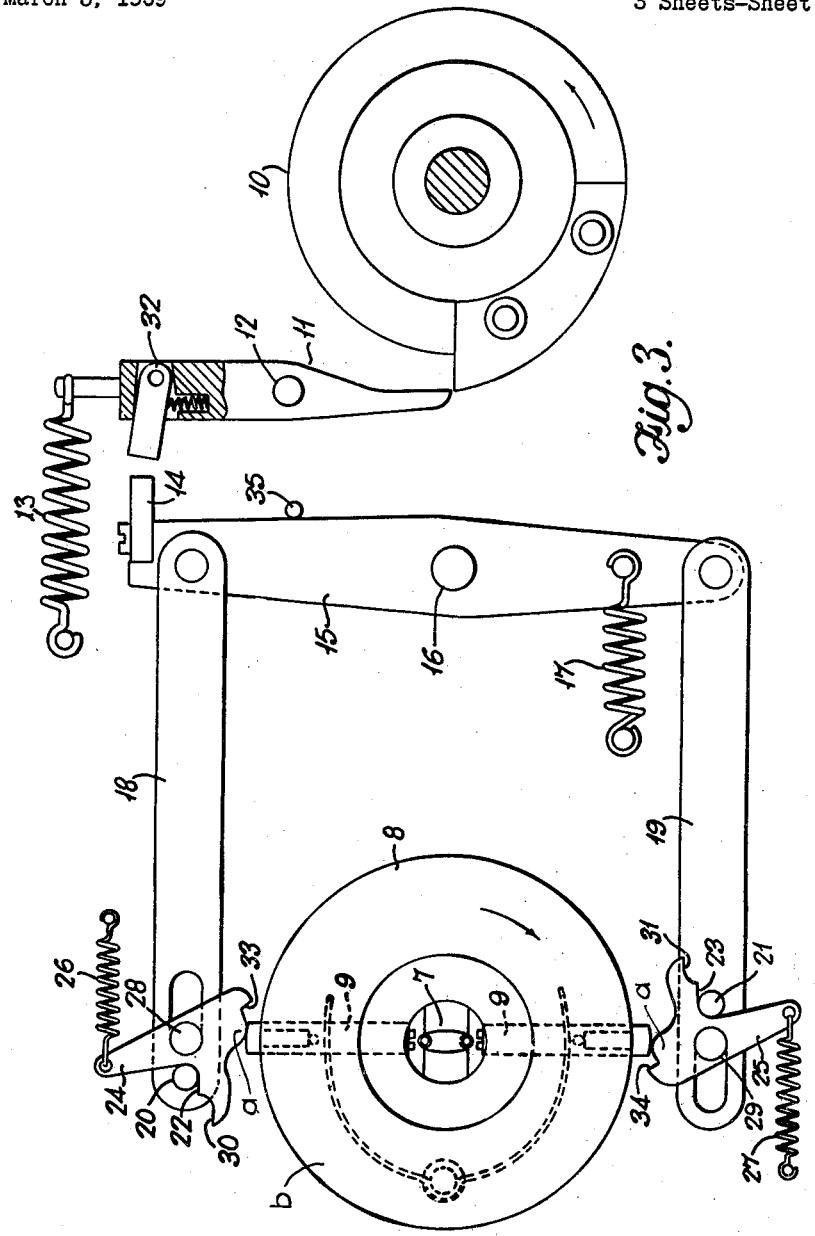

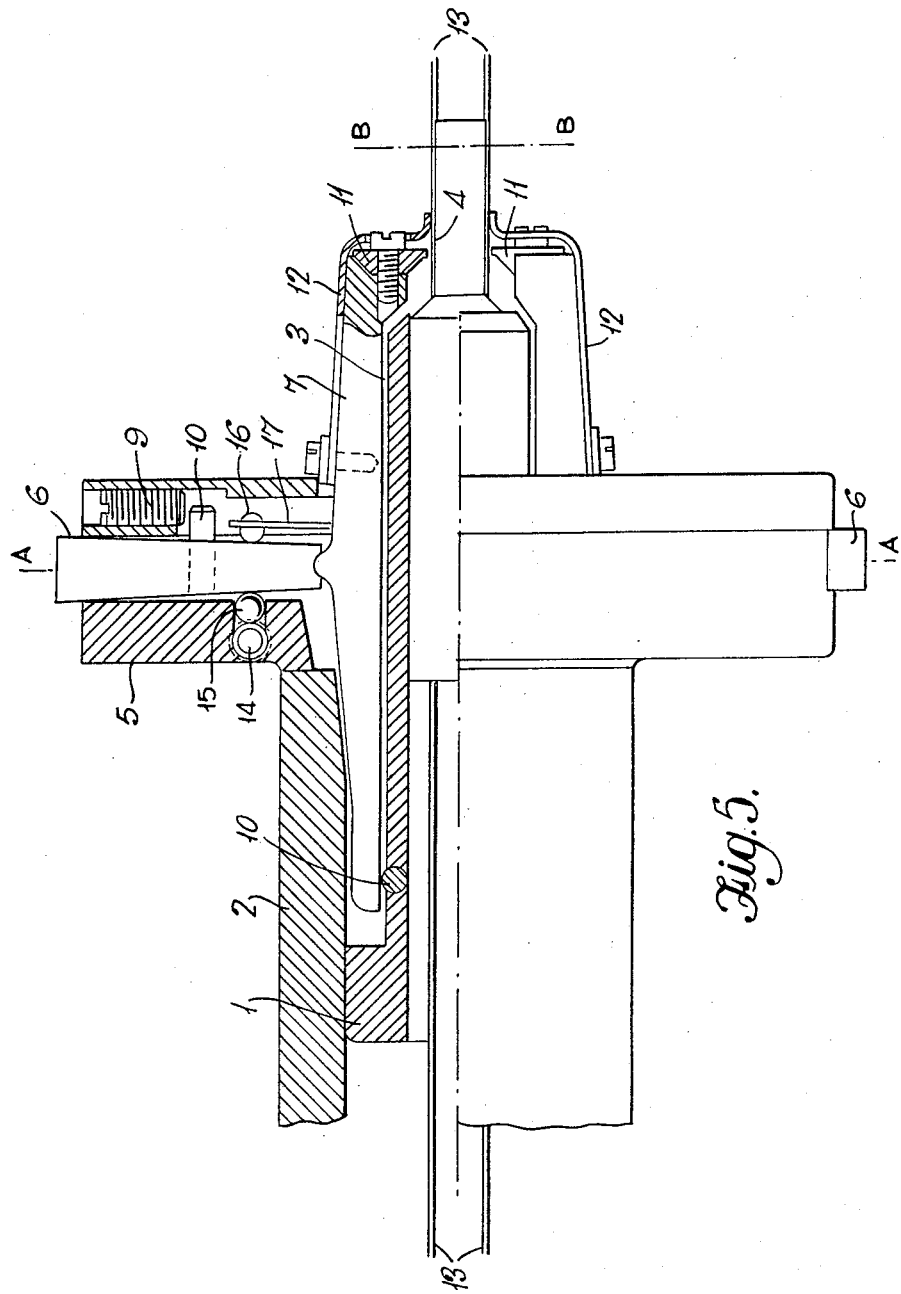

United States Patent Office 3,071,031
Patented Jan. 1, 1963

3,071,031
THERMIONIC VALVE GRID WINDING MACHINES
Clayton Arbuthnot Lane and John Kay, Enfield, England, assignors to Associated Electrical Industries (Woolwich) Limited, a British company
Filed Mar. 3, 1959, Ser. No. 796,928
Claims priority, application Great Britain Mar. 7, 1958
4 Claims. (Cl. 78—21)

This invention relates to thermionic valve grid winding machines. It is concerned with the production of notches on the grid support wires.

A grid notch may be defined as a protrusion which is integral with the support wire and is usually required to act as a stop against a mica or other similar electrode-spacing component, so as to locate the grid relative to that component.

Such notches are usually cold forged by means of a punch hitting a portion of the wire where it is supported by an anvil. Hitherto, a notch has been made first on one support wire and then on the other at the next half revolution of the winding machine so that the two notches are off-set by half the pitch of the grid helix. It is, however, desirable that the notches are made square with the axis of the grid. Electro-mechanical methods have been employed for doing this whereby two duplicate electrical solenoids, one for each notch, have been energised by a common switch. This has the disadvantage that the time between the closing of the switch and the operation of the solenoid is long compared with the time of half a revolution of the winding machine necessitating early closing of the switch. This time is affected both by machine speed and supply voltage fluctuation.

It is an object of the present invention to provide a mechanical mechanism which is extremely rapid in operation.

According to the present invention in a thermionic grid winding machine comprising means for rotating the grid and means for causing the grid to progress along its axis of rotation so that a grid wire can be wound thereon in helical fashion, there is provided an arrangement for notching the grid support wires comprising a head arranged to rotate in synchronism wtih the grid and carrying two nothcing punches positioned diametrically opposite each other along a line normal to the axis of rotation of the grid when being wound, and driving means for simultaneously forcing both punches radially inwardly, said driving means being cocked when the grid has progressed axially by a predetermined amount, and is operated when the head reaches a particular angular position after said cocking.

In order that the invention may be more fully understood reference may now be made to the accompanying drawing in which:

FIG. 3 shows one embodiment of the invention;

FIG. 5 shows another embodiment of the invention.

Figure 1A:
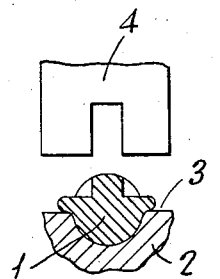
FIGS. 1a and 1b show in side and end elevation the manner in which a notch may be formed on a support wire.
Figure 1B:
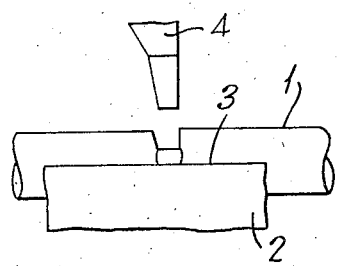
Figure 2:
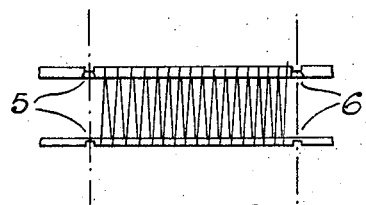
FIG. 2 shows the desirable positions on a support wire for the notches.

Referring to FIGS. 1a and 1b a grid support wire 1 is supported in an anvil 2 which is part of the grid winding nose and consists of a semi-circular groove provided with two flat faces 3 on each side of the groove. A punch 4 is provided with a slit as shown and when forced down on the wire 1, it squeezes metal out side-ways between it and the faces 3 to form a notch. It is desirable that these notches are located in each support wire so as to be square in the axis of the grid as shown in FIG. 2, where 5 and 6 are pairs of notches adjacent each end of the support wires.

One arrangement of effecting this is shown in FIG. 3, which a grid 7 being wound as shown in end view and is coupled to means (not shown) for rotating the grid in a clockwise direction while at the same time causing the grid to progress axially. A head 8 is provided which is arranged to rotate with the grid and houses two notching punches 9 positioned diametrically opposite each other along a line normal to the axis of rotation of the grid and arranged to be movable radially inwards in two radially extending slides.

Drive means are provided for simultaneously forcing both punches radially inwards. This drive means is cocked when the grid has progressed axially by a predetermined amount by a cam 10 geared to the grid rotating means and arranged to rotate in an anti-clockwise direction. A lever 11 pivoted about a pin 12 is held against the cam by a powerful spring 13. When the tip of lever 11 drops off the step on the cam, the top thereof, which carries a pawl 32, moves rapidly to the left so that pawl 32 imparts a sharp blow to the side of a hardened plate 14 which causes a lever 15 pivoted about a pin 16 and biased by a comparatively weak spring 17 to rotate slightly in an anticlockwise direction. This partial rotation of lever 15 pushes a top link 18 and pulls a bottom link 19.

At the end of link 18 an arm 24 is provided pivoted about a pin 28 and biased by a spring 26 so as to tend to rotate in a clockwise direction. This rotation is prevented by means of a pin 20 mounted on link 18 and in engagement wtih a step 22 cut in arm 24. A similar arm 25 is provided at the end of link 19 pivoted about a pin 29 and biased by a spring 26 so as to tend to rotate in clockwise direction. This rotation is similarly prevented by a pin 21 mounted on link 19 and in engagement with a step 23 cut in arm 25. Arms 24 and 25 each have further steps 30 and 31 cut in them and the anticlockwise rotation of lever 15 allows the arms to rotate a few degrees in a clockwise direction under the influence of their springs until the rotation is arrested when steps 30 and 31 come into contact with pins 20 and 21. This operation initiated by cam 10 will have been timed to occur just after the outer ends of the notched punches 9 have cleared the tips of the arms so that the arms take up position with their radially extending steps 33 and 34 about the same distance the other side of the vertical centre line through the grid as that shown in the drawing. While this has been happening the partial rotations of the two levers 11 and 15 have allowed pawl 32 to slide under plate 14 so that lever 15 is now prevented from returning against its stop pin 35 only by means of the pins 20 and 21 being held by steps 30 and 31 in the arms. The arms are now cocked and are ready to drive the punches.

Meanwhile, head 8 continues to rotate so that in less than half a revolution of head 8 after clearing the arms the drive means is operated by the outer ends of the notching punches 9 engaging with steps 33 and 34 of the arms and carrying them round so that as they pass over the dead centre position the slightly radiused portions a of the arms force the notching punches inwards to forge notches simultaneously on each of the grid support wires. At the same time the rotation of the punches throw the arms well over against the pull of spring 26 and 27 thereby disengaging pins 20 and 21 from steps 30 and 31. This allows lever 15 to return against its stop pin 35 taking links 18 and 19 with it and locating the arms clear of the ends of the punches with the pins 20 and 21 engaged with the steps 22 and 23. The mechanism is thus returned to its original position and remains there until action is again initiated. The punches are returned to their original position by means of C-springs b.

As the cam 10 rotates pawl 32 remains located under plate 14 until the lower end of lever 11 is pushed outwards by the gradual rise of the lobe of the cam which eventually deflects lever 11 to the position shown and the pawl then flicks upwards when clear of plate 14 by means of the small compression spring 26.

When two pairs of notches at each end of the grid are required as shown in FIG. 2, two lobes can be mounted on the cam at appropriate positions so that the action takes place twice while the grid is being wound.

Figure 4:
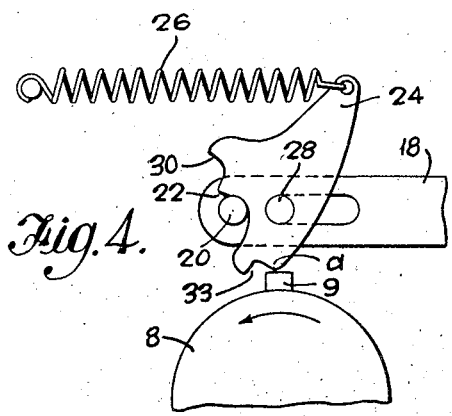
FIG. 4 shows a minor modification of FIG. 3.

When the grid is required to be rotated in the opposite direction, i.e. anticlockwise, so as to wind helix grids of the opposite hand the same mechanism can be used except that they are made of a different shape and the spring is anchored to the opposite side of the arm as illustrated in FIG. 4 in which like parts have like reference numerals. In this arrangement the action is similar to that already described except that the arms jump into their action positions in an anti-clockwise direction instead of a clockwise direction.

The arrangement illustrated in FIG. 5 is designed to produce notches as close as possible to the point of winding so as to prevent any inaccuracies in the distance between the end of the helix and the notches due to hammering of the support wires in the nick and swage process. As shown in the FIGURE, the body 1 of the notching head is keyed into the bore of the spindle 2 of the grid winding machine head stock. The notching head thus rotates together with the grid. Notching head 1 is hollow so as to allow for the mounting of the grid winding nose 3 and for the grid support wires 13. Springs 12 hold wires 13 in the grooves of the nose. The winding point of the helix wire is at the plane BB.

The notching head 1 is provided with a flange 5 in which are cut two square radial grooves diametrically opposite each other in which push rods 6 can slide. At the inner end of push rod 6 there is cut a concave semi-cylindrical groove across the width of the rod which engages with a convex semi-cylindrical projection provided on a lever 7 capable of a slight amount of movement about a hardened steel pin 10. Notching punches 11 are secured to the end of lever 7 and work against an anvil 4. A small leaf spring 12 is mounted on lever 7 to hold the lever against push rod 6 and also hold support wires 13 in the groove of the anvil 4.

Outward movement of push rod 6 is prevented by a stop pin 8 resting against an adjusting grub screw 9.

The mechanism operates by push rod 6 being forced radially inwards by means of an arrangement as described with reference to FIG. 3 or FIG. 4 and this inward movement is communicated by means of lever 7 to notching punch 11 which is forced down on to support wire 13. By this means a notching mechanism positioned in the plane of the line AA can produce a notch in the position shown which can be as close as 5/16 inch to 1/4 inch from the winding taking place in the line BB.

It is also possible to provide a small axial adjustment of the position of the notches on the support wires and this is achieved by means of a pointed screw 14 operating on the back of a ball 15 so as to tilt push rod 6 to the right or left and carry with it lever 7. Push rod 6 is held against ball 15 by means of a domed rivet 16 fixed to a leaf spring 17 secured to the body 1.

Preferred embodiments of the invention have been described. Various changes and modifications, however, may be made within the scope of the invention as set forth in the appended claims.

What we claim is:

1. In a grid winding machine an arrangement for notching the grid support wires comprising a head concentric with and surrounding the grid and arranged to rotate in synchronism therewith, two notching punches carried by said head and positioned diametrically opposite each other along a line normal to the axis of the grid being wound, driving means having abutment surfaces for simultaneously engaging the ends of said punches to force both punches radially inwardly, means connected to said abutment surfaces for holding the abutment surfaces clear of said punches, and means operatively connected to said driving means for cocking said driving means when the grid has progressed axially by a predetermined amount so as to move said abutment surfaces into positions to engage said punches.

2. In a grid winding machine an arrangement for notching the grid support wires comprising a head concentric with and surrounding the grid and arranged to rotate in synchronism therewith, two notching punches carried by said head and positioned diametrically opposite each other along a line normal to the axis of the grid being wound, driving means for said punches comprising a pair of arms provided with radiused portions held clear of the ends of said punches, means for rotating said arms when the grid has progressed axially by a predetermined amount so as to position said radiused portions to simultaneously engage the ends of said punches when said punches reach the angular positions of said arms and drive said punches radially inwards.

3. In a grid winding machine an arrangement for notching the grid support wires comprising a head concentric with and surrounding the grid and arranged to rotate in synchronism therewith, two notching punches carried by said head and positioned diametrically opposite each other along a line normal to the axis of the grid being wound the outer ends of the punches extending outwardly of the head, driving means for said punches comprising a pair of arms provided with radiused portions and steps and positioned clear of the ends of said punches, means for rotating said arms when the grid has progressed axially by a predetermined amount so as to position said steps to be simultaneously engaged by the ends of said punches to swing said arms and cause said radiused portions to drive said punches radially inwards.

4. In a grid winding machine an arrangement for notching the grid support wires comprising a head concentric with and surrounding the grid and arranged to rotate in synchronism with the grid, two notching punches carried by said head and positioned diametrically opposite each other along a line normal to the axis of the grid being wound, the outer ends of the punches extending outwardly of the head, driving means for simultaneously forcing both punches radially inwardly, said driving means comprising a pair of arms provided with radiused portions and steps, spring bias means for holding said arms clear of the ends of said punches, means for rotating said arms in one direction against said spring bias means when the grid has progressed axially by a predetermined amount so as to position said steps to be engaged by the ends of said punches to rotate said arms in the opposite direction and cause said radiused portions to operate said punches, said spring bias means serving to return said arms to their original position after operation of said punches.

References Cited in the file of this patent

UNITED STATES PATENTS

| 55,501 | Kaylor | June 12, 1866 |
| 629,838 | Whyland | Aug. 1, 1899 |
| 2,611,430 | Elliott | Sept. 23, 1952 |

FOREIGN PATENTS

| 28,411 | Great Britain | Dec. 24, 1907 |
| 470,107 | Germany | Jan. 5, 1929 |
| 710,409 | Great Britain | June 9, 1954 |